(12) United States Patent
Seo et al.

(10) Patent No.: US 9,712,301 B2
(45) Date of Patent: *Jul. 18, 2017

(54) METHOD AND DEVICE FOR TRANSMITTING/RECEIVING DOWNLINK REFERENCE SIGNAL IN WIRELESS COMMUNICATION SYSTEM

(71) Applicant: LG Electronics Inc., Seoul (KR)

(72) Inventors: Hanbyul Seo, Anyang-si (KR); Kijun Kim, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 14/602,946

(22) Filed: Jan. 22, 2015

(65) Prior Publication Data

US 2015/0139151 A1    May 21, 2015

Related U.S. Application Data

(63) Continuation of application No. 13/976,860, filed as application No. PCT/KR2012/000121 on Jan. 5, 2012, now Pat. No. 8,971,381.

(Continued)

(51) Int. Cl.
*H04L 5/00* (2006.01)
*H04J 13/18* (2011.01)
(Continued)

(52) U.S. Cl.
CPC ......... *H04L 5/0048* (2013.01); *H04B 1/7103* (2013.01); *H04B 7/024* (2013.01); *H04J 11/0053* (2013.01); *H04J 13/18* (2013.01); *H04L 5/0016* (2013.01); *H04L 5/0023* (2013.01); *H04L 5/0026* (2013.01);
(Continued)

(58) Field of Classification Search
None
See application file for complete search history.

(56) References Cited

U.S. PATENT DOCUMENTS 9,591,638 B2 *   3/2017   Chatterjee ............ H04W 72/044
2009/0268910 A1 * 10/2009   Liu ....................... H04J 11/0079
                                                             380/268

(Continued)

FOREIGN PATENT DOCUMENTS

CN    101309134 A    11/2008
CN    101662443 A    3/2010

(Continued)

OTHER PUBLICATIONS

Samsung: "Design on scrambling sequence for MU-MIMO", 3GPP TSG RAN WG1 meeting #59, R1-094580, Nov. 9-13, 2009.

(Continued)

*Primary Examiner* — Hassan Kizou
*Assistant Examiner* — Deepa Belur
(74) *Attorney, Agent, or Firm* — Dentons US LLP

(57) ABSTRACT

The present invention relates to a wireless communication system, and discloses a method and a device for transmitting/receiving a downlink reference signal in a wireless communication system. The present invention provides a way for maintaining orthogonality of a reference signal between cells in a multi-cell operation.

9 Claims, 9 Drawing Sheets

Related U.S. Application Data

(60) Provisional application No. 61/431,414, filed on Jan. 10, 2011.

(51) Int. Cl.
  *H04B 1/7103* (2011.01)
  *H04J 11/00* (2006.01)
  *H04B 7/024* (2017.01)

(52) U.S. Cl.
  CPC .......... *H04L 5/0035* (2013.01); *H04L 5/0051* (2013.01); *H04L 5/0073* (2013.01); *H04L 5/0091* (2013.01); *H04L 5/0082* (2013.01)

(56) References Cited

U.S. PATENT DOCUMENTS

| | | | |
|---|---|---|---|
| 2010/0189038 A1 | 7/2010 | Chen et al. | |
| 2010/0272040 A1* | 10/2010 | Nam | H04J 13/0077 370/329 |
| 2010/0285810 A1 | 11/2010 | Ko et al. | |
| 2010/0323709 A1* | 12/2010 | Nam | H04L 5/0094 455/450 |
| 2011/0085503 A1* | 4/2011 | Nam | H04W 72/042 370/329 |
| 2011/0199986 A1 | 8/2011 | Fong et al. | |
| 2011/0317745 A1* | 12/2011 | Okubo | H04J 13/0059 375/140 |
| 2012/0176982 A1* | 7/2012 | Zirwas | H04B 7/024 370/329 |

FOREIGN PATENT DOCUMENTS

| | | |
|---|---|---|
| CN | 101719888 A | 6/2010 |
| CN | 101841357 A | 9/2010 |
| CN | 101841845 A | 9/2010 |
| CN | 101867938 A | 10/2010 |
| KR | 1020040090736 | 10/2004 |
| KR | 1020060046677 | 5/2006 |
| KR | 1020090061763 | 6/2009 |
| KR | 1020100129315 | 12/2010 |
| WO | 2010017334 A1 | 2/2010 |

OTHER PUBLICATIONS

Panasonic: "DMRS port indication with MU-MIMO considerations", 3GPP TSG RAN WG1 Meeting #60, R1-101264, Feb. 22-26, 2010.

Nokia Siemens Networks: "Considerations on Initialization and Mapping of DM-RS Sequence", 3GPP TSG RAN WG1 #58bis Meeting, R1-093890, Oct. 12-16, 2009.

Samsung: "Discussions on CSI-RS for LTE-Advanced"; 3GPP TSG RAN WG1 #58, R1-093375, Shenzhen, China, Aug. 24-28, 2009.

Philips: "DL MIMO extension for LTE-A: signalling support for interference management", 3GPP TSG RAN WG1 Meeting #58bis, Tdoc R1-093933, Miyazaki, Japan, Oct. 12-16, 2009.

Qualcomm Europe: "Specification details for PRS sequences", 3GPP TSG RAN1 #52, R1-080640, Sorrento, Italy, Feb. 11-15, 2008.

* cited by examiner

FIG. 6
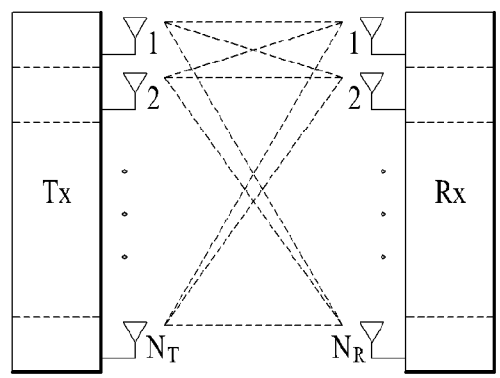
(a)
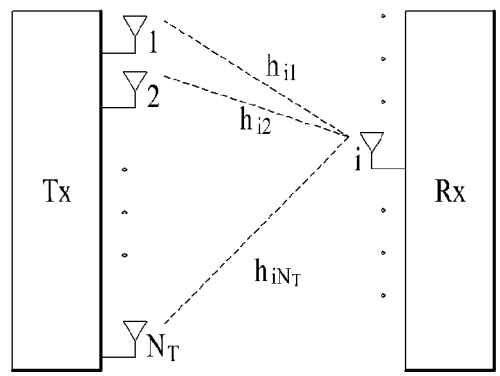
(b)

METHOD AND DEVICE FOR TRANSMITTING/RECEIVING DOWNLINK REFERENCE SIGNAL IN WIRELESS COMMUNICATION SYSTEM

This application is a continuation of, and claims priority to, U.S. patent application Ser. No. 13/976,860 filed Jun. 27, 2013, which is a National Stage Entry of International Application No. PCT/KR2012/000121, filed Jan. 5, 2012, and claims the benefit of U.S. Provisional Application No. 61/431,414, filed Jan. 10, 2011, all of which are hereby incorporated by reference in their entirety herein.

TECHNICAL FIELD

The present invention relates to a wireless communication system, and more particularly, to a method of transceiving a downlink reference signal in a wireless communication system and apparatus for the same.

BACKGROUND ART

Generally, MIMO (multi-input multi-output) technique means a method of improving transceived data efficiency by adopting MIMO transmitting antennas and MIMO receiving antennas instead of a single transmitting antenna and a single receiving antenna. If a single antenna is used, a receiving side receives data via a single antenna path. If multi-antennas are used, a receiving side may be able to receive data via several paths. Therefore, data rate and throughput can be improved and coverage can be increased. Single-cell MIO operation can be categorized into SU-MOMO (single user-MIMO) scheme for a single user equipment to receive a downlink signal in one cell and MU-MIMO (multiuser-MIMO) scheme for at least two user equipments to receive a downlink signal in one cell.

Meanwhile, many ongoing efforts are made to research and develop coordinated multi-point (CoMP) system to improve throughput of a user on a cell boundary by applying improved MIMO transmission in multi-cell environment. If the CoMP system is applied, it may be able to reduce inter-cell interference in multi-cell environment and to improve overall system performance.

CoMP scheme may be categorized into JP (joint processing) scheme for enabling downlink data to be shared with all CoMP coordinating cells to be transmitted to a specific user equipment and CBF (coordinated beamforming) scheme having downlink data exist in one cell only. The JP scheme may be categorized again into JT (joint transmission) scheme for enabling all coordinating cells to join a signal transmission and CSL (cooperative silencing) scheme for one cell to join a signal transmission only in a manner that the rest of cells stop signal transmission to reduce interference. In the CBF scheme, each coordinating cell, which does not transmit a signal to a user equipment, is able to reduce inter-cell interference in a manner of determining a beamforming matrix of a user equipment, which receives a signal from the corresponding coordinating cell) to apply a less amount of interference to the corresponding user equipment.

DISCLOSURE OF THE INVENTION

Technical Problem

In order to correctly demodulate downlink data transmitted on a downlink (DL) data channel (e.g., PDSCH), a reference signal (RS) for a DL channel is required. And, such a reference signal may be called a demodulation reference signal (DMRS). In case of DL multi-layer transmission in a single cell, it is necessary for orthogonality to be maintained between DMRSs in order to correctly apply DMRS for each layer. Yet, in case of a multi-cell operation (e.g., CoMP operation), it may cause a problem that orthogonality is not maintained between DMRS of a prescribed cell and DMRS of a neighbor cell. For instance, if the orthogonality between DMRS from a serving cell and DMRS from a neighbor cell is not maintained, a corresponding user equipment is unable to correctly perform channel estimation via DMRS, whereby a problem of reducing total network throughput is caused.

The technical object of the present invention is to provide a method of maintaining DMRS orthogonality between cells in a multi-cell operation.

Technical objects obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting a reference signal, which is transmitted to a user equipment by a base station in a wireless communication system, according to one embodiment of the present invention may include the steps of transmitting a reference signal configuration information to the user equipment, generating a sequence of the reference signal in accordance with the reference signal configuration information, mapping the reference signal to a downlink resource, and transmitting the mapped reference signal to the user equipment.

To further achieve these and other advantages and in accordance with the purpose of the present invention, a method of receiving a reference signal, which is received by a user equipment from a base station in a wireless communication system, according to another embodiment of the present invention may include the steps of receiving a reference signal configuration information from the base station and receiving the reference signal from the base station using the reference signal configuration information, wherein a sequence of the reference signal is generated in accordance with the reference signal configuration information and wherein the reference signal is transmitted by being mapped to a downlink resource.

To further achieve these and other advantages and in accordance with the purpose of the present invention, a reference signal transmitting base station, which transmits a reference signal to a user equipment in a wireless communication system, according to a further embodiment of the present invention may include a receiving module configured to receives an uplink signal from the user equipment, a transmitting module configured to transmit a downlink signal to the user equipment and a processor configured to control the base station including the receiving module and the transmitting module, the processor configured to transmit a reference signal configuration information to the user equipment via the transmitting module, the processor configured to generate a sequence of the reference signal in accordance with the reference signal configuration information, the processor configured to map the reference signal to a downlink resource, the processor configured to transmit the mapped reference signal to the user equipment via the transmitting module.

To further achieve these and other advantages and in accordance with the purpose of the present invention, a reference signal receiving user equipment, which receives a reference signal from a base station in a wireless communication system, according to another further embodiment of the present invention may include a receiving module configured to receive a downlink signal from the base station, a transmitting module configured to transmit an uplink signal to the base station, and a processor configured to control the user equipment including the receiving module and the transmitting module, the processor configured to receive a reference signal configuration information from the base station via the receiving module, the processor configured to receive the reference signal from the base station via the receiving module using the reference signal configuration information, wherein a sequence of the reference signal is generated in accordance with the reference signal configuration information and wherein the reference signal is transmitted by being mapped to a downlink resource.

The following matters may be applicable in common to the above-mentioned embodiments of the present invention.

Preferably, the reference signal configuration information may include at least one of a seed value used for generation of the sequence of the reference signal, a position of a resource element having the reference signal mapped thereto, and an information on a spreading code applied to the reference signal.

More preferably, the seed value may include a cell identifier of a neighbor cell.

More preferably, the position of the reference element having the reference signal mapped thereto may include a subcarrier position different from the resource element having the reference signal of the neighbor cell mapped thereto.

In this case, a position of the resource element to which the reference signal for a prescribed antenna port may be mapped in the base station transmitting the reference signal comprises the subcarrier position different from the resource element to which the reference signal for the prescribed antenna port of the neighbor cell is mapped.

More preferably, the spreading code applied to the reference signal comprises a spreading code of which phase may be inverted on a slot boundary in comparison with the spreading code applied to the reference signal of a neighbor cell.

In this case, a spreading code applied to the reference signal for a prescribed antenna port in the base statin transmitting the reference signal may include a spreading code of which phase is inverted on the slot boundary in comparison with the spread code applied to the reference signal for the prescribed antenna port of the neighbor cell.

Preferably, the reference signal configuration information may include an indicator indicating whether a changed reference signal configuration is applied.

Preferably, the reference signal configuration information may be transmitted via at least one of a physical layer channel and an upper layer signaling.

More preferably, a plurality of candidates for the reference signal configuration may be provided to the user equipment in advance via the upper layer signaling and the reference signal configuration information of one selected from a plurality of the candidates may be indicated via the physical layer channel.

Preferably, the reference signal may include the reference signal for demodulation of a downlink data channel.

The above-mentioned general description of the present invention and the following details of the present invention are exemplary and may be provided for the additional description of the invention disclosed in claims.

Advantageous Effects

According to the present invention, a method of maintaining DMRS orthogonality between cells in a multi-cell operation can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a block diagram for a configuration of a wireless communication system having multiple antennas.

BEST MODE FOR INVENTION

Figure 1:
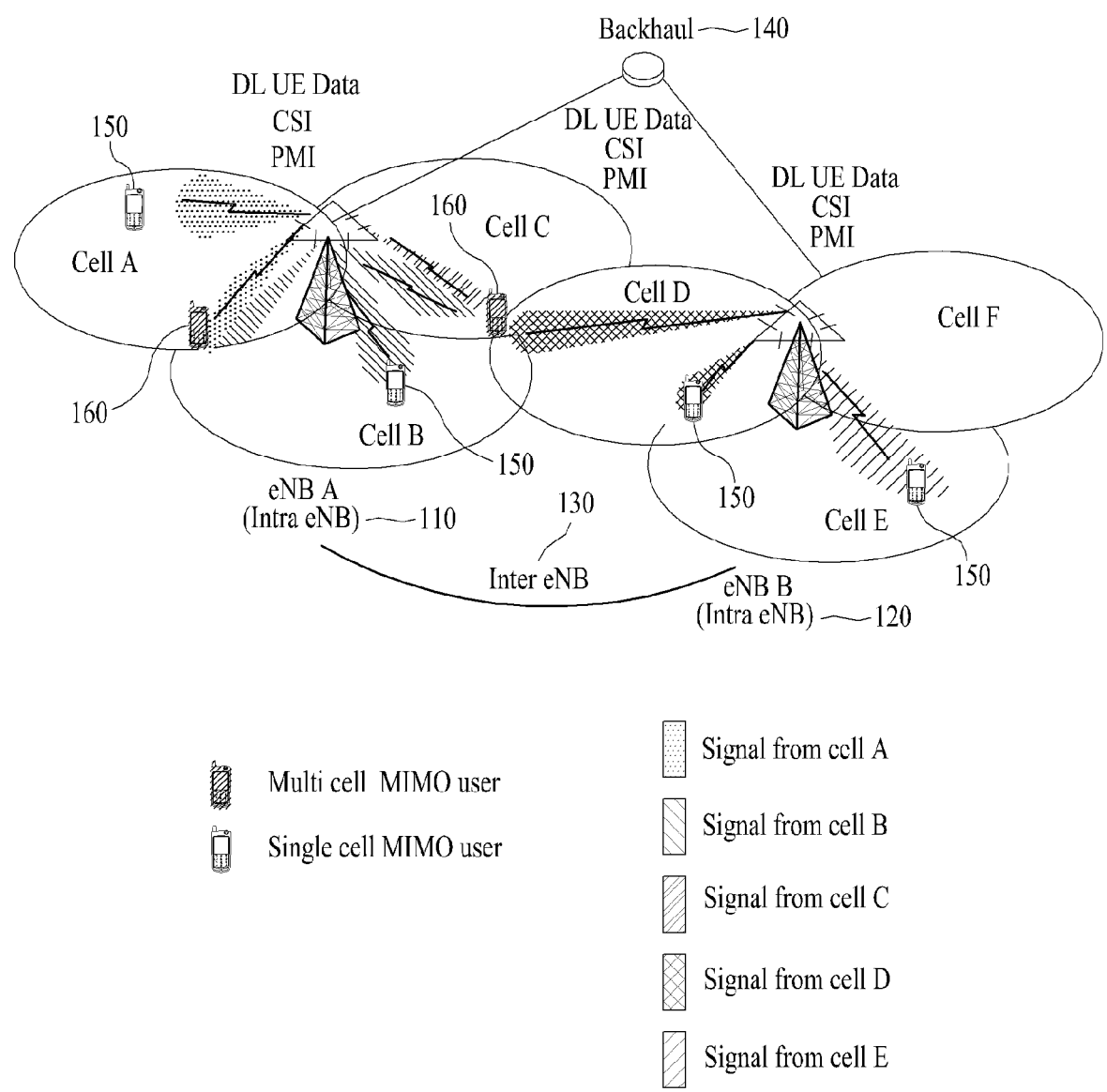
FIG. 1 is a diagram to conceptionally describe operation of a coordinated multi-point (COMP) system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a user equipment. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

Coordinated Multi-Point (CoMP)

CoMP (coordinated multi-point) system is described with reference to FIG. 1 as follows. FIG. 1 is a conceptual diagram for CoMP (coordinated multi-point) operation of an intra eNB and an inter eNB according to a related art.

Referring to FIG. 1, intra eNBs 110 and 320 and an inter eNB 130 exist in a multi-cell environment. In LTE (long term evolution) system, an intra eNB is constructed with several cells or sectors. Cells belonging to an eNB, to which a specific user equipment belongs, have the relation of the intra eNBs 110 and 120 with the specific user equipment and. In particular, the cells sharing the same eNB with the cell having the user equipment belong thereto become the cells corresponding to the inter eNB 130. Thus, the cells (i.e., intra base stations), which are based on the same eNB of the specific user equipment, may exchange channel state information (CSI) with each other without a separate interface between schedulers of the cells. Yet, the cells (i.e., inter eNBs), which are based on other eNB), are able to exchange inter-cell information via a backhaul 140 and the like. A single-cell MIMI user 150 in a single-cell, as shown in FIG. 1, communicates with one serving eNB in one cell (e.g., cell A, cell B, cell D, cell E). And, a multi-cell MIMO user 160 situated on a cell boundary is able to communicate with a plurality of serving eNBs in multi-cells (e.g., cell A and cell B, cell B, cell C and cell D).

In accordance with an improved system performance requirements of 3GPP LTE-A system, CoMP transmission/reception scheme (represented as one of co-MIMO (collaborative MIMO), network MIMO, etc.) has been proposed. CoMP may raise performance of a user equipment located at a cell edge and may raise average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple manual scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

CoMP schemes applicable to a case of downlink may be mainly classified into a joint processing (JP) scheme and a coordinated scheduling/coordinated beamforming (CS/CB) scheme.

According to the JP scheme, each point (e.g., base station) of CoMP cooperation unit may use data. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of points (portion or all of CoMP cooperation unit) at a time. In particular, data transmitted to a single user equipment may be simultaneously from a plurality of transmission points. According to the joint transmission scheme, a quality of a coherently or non-coherently received signal may be improved and interference on another user equipment may be actively eliminated.

The dynamic cell selection scheme may mean the scheme of transmitting PDSCH from one point (of CoMP cooperation unit) at a time. In particular, data transmitted to a single user equipment at a specific timing point is transmitted from one point, the rest of points in the cooperation unit at that timing point do not perform data transmission to the corresponding user equipment, and a point of transmitting data to the corresponding user equipment may be dynamically selected.

Meanwhile, according to the CS/CB scheme, CoMP cooperation units may be able to cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of points geographically spaced apart from each other is received. CoMP schemes applicable to a case of uplink may be classified into joint reception (JR) and coordinated scheduling/coordinated beamforming (CS/CB). The JR scheme means that a signal transmitted on PUSCH is received by a plurality of reception points. And, the CS/CB scheme means that user scheduling/beamforming is determined by coordination of cells of CoMP cooperation unit despite that PUSCH is received by one point only.

Using this CoMP system, a user equipment may be supported with data jointly from multicell base station. Each base station supports at least one or more user equipments simultaneously using the same radio frequency resource, thereby improving performance of system. And, the base station may be able to perform space division multiple access (SDMA) scheme based on channel state information between the base station and a user equipment.

In CoMP system, a serving base station and at least one or more coordinating base stations are connected to a scheduler via a backbone network. The scheduler may operate by receiving a feedback of channel information on a channel state, which is measured by each base station, between each user equipment and each coordinating base station via the backbone network. For instance, the scheduler may be able to schedule information for cooperative MIMO operation for a serving base station and at least one coordinating base station. In particular, the scheduler may be able to directly instruct each base station on the cooperative MIMO operation.

As mentioned in the foregoing description, the CoMP system may be operate as a virtual MIMO system by binding a plurality of adjacent cells into one group. Basically, a communication scheme of MIMO system using multi-antennas may be applicable. Operations of the MIMO system shall be described in detail later.

Downlink/Uplink Structure

A structure of a downlink radio frame is described with reference to FIG. 2 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
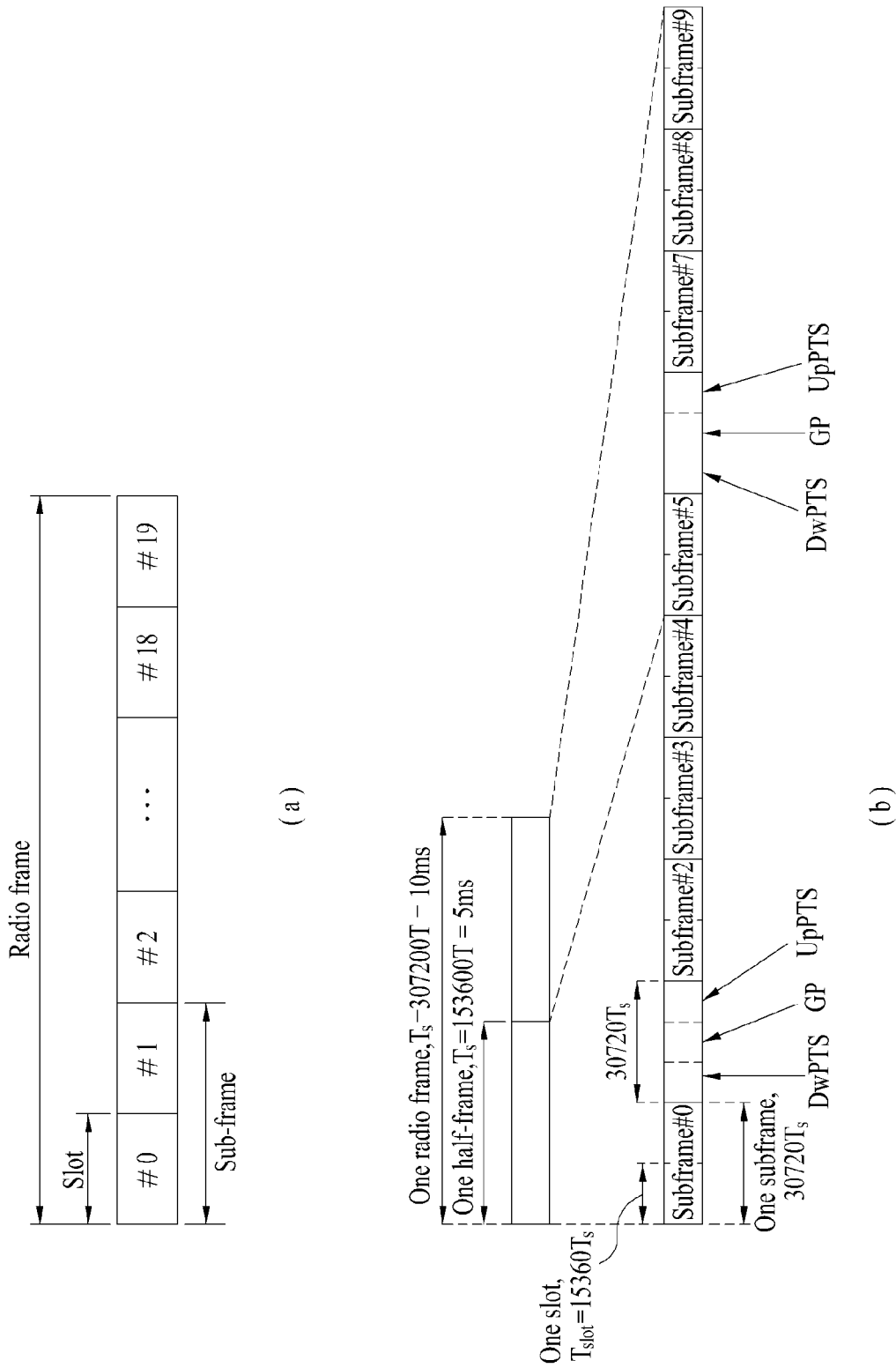
FIG. 2 is a diagram for a structure of a downlink radio frame.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel state is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 3:
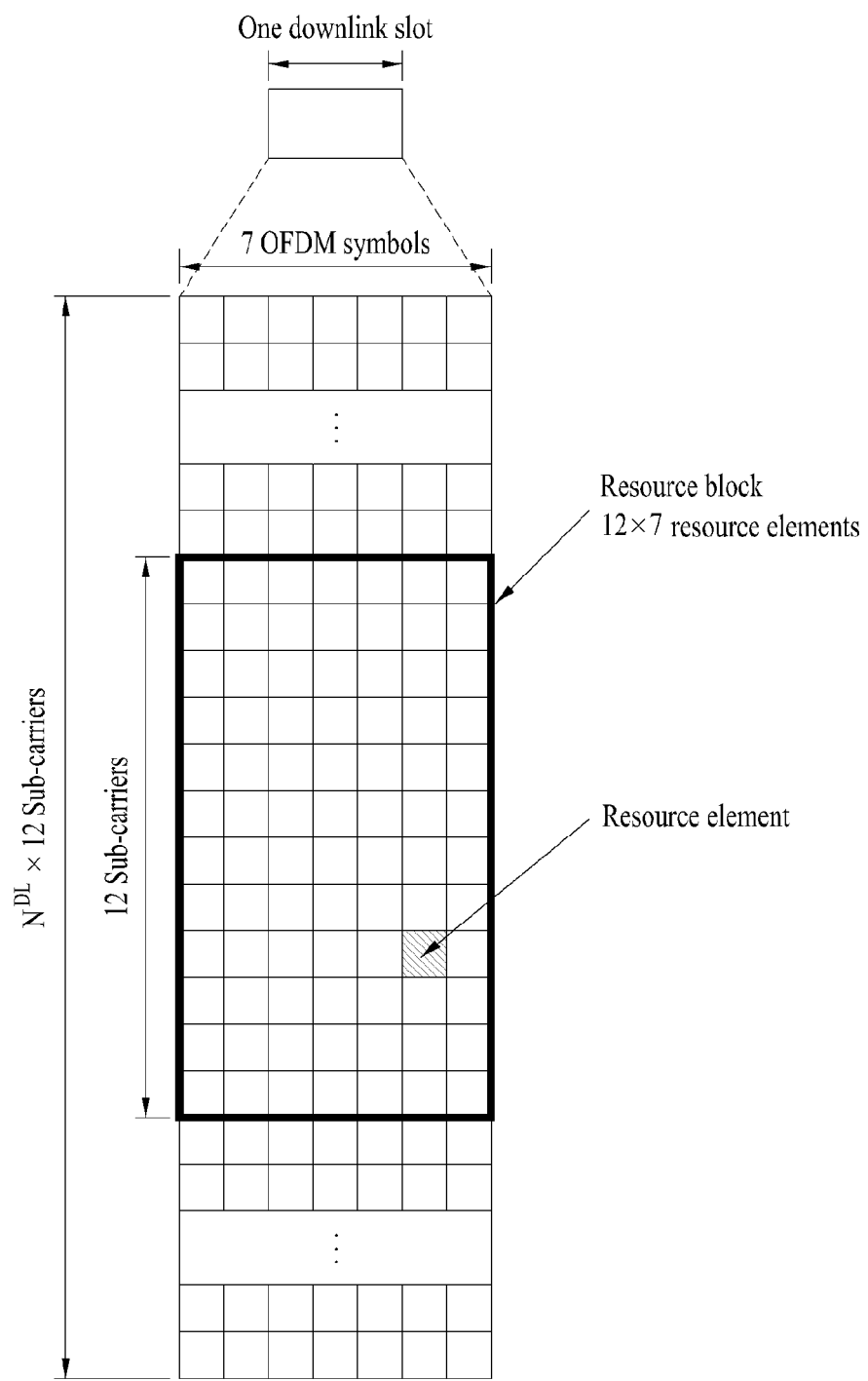
FIG. 3 is a diagram for one example of a resource grid in a downlink slot.

FIG. 3 is a diagram for one example of a resource grid for a downlink (DL) slot. Referring to FIG. 3, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). one resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
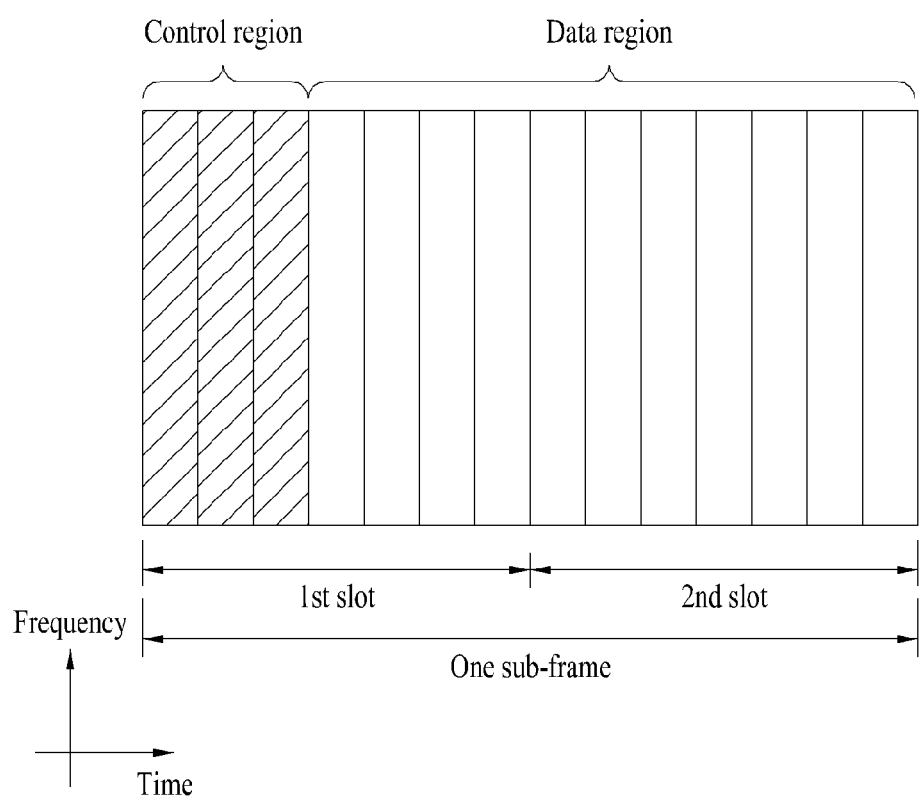
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel state. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
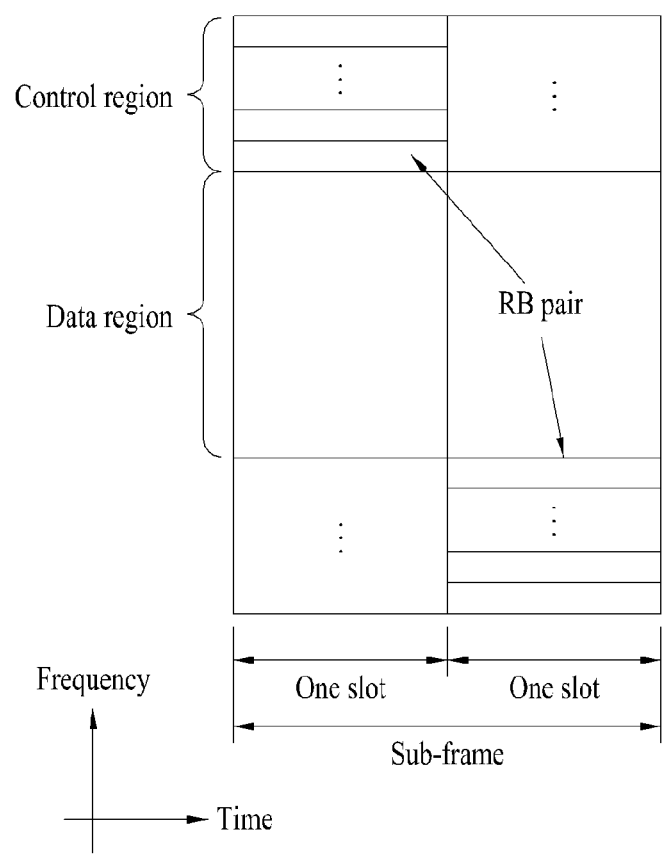
FIG. 5 is a diagram for an uplink subframe.

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

FIG. 6 is a diagram for a configuration of a wireless communication system including multiple antennas.

Referring to FIG. 6 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_0$ of the case of using a single antenna by a rate increasing rate $R_i$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of these techniques are already adopted as standards for various wireless communications such as 3G mobile communications, a next generation wireless LAN and the like.

The trends for the MIMO relevant studies are explained as follows. First of all, many efforts are ongoing to be made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \quad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{s}$ may be represented as follows using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector Ŝ, a case of configuring $N_T$ transmission signals $x_1, x_2, \ldots x_{N_T}$ actually transmitted may be taken into consideration as follows. In this case, the weight matrix W plays a role in properly distributing each transmission information to each antenna according to a transmission channel state and the like. The $x_1, x_2, \ldots, x_{N_T}$ may be represented as followings using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \qquad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 6 (b) shows a channel to a receiving antenna i from each of $N_T$ transmitting antennas. These channels may be represented as a vector or matrix in a manner of tying the channels b together. Referring to FIG. 6 (b), the channels between the receiving antenna i and the $N_T$ transmitting antennas can be represented as follows.

$$h_i^T = [h_{i1}, h_{i2}, \ldots, h_{iN_T}] \qquad \text{[Formula 7]}$$

Hence, all the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Formula 8]}$$

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T \qquad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Formula 10]}$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_1$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted as follows.

$$\text{Rank}(H) \leq \min(N_T, N_R) \qquad \text{[Formula 11]}$$

For another definition of a rank, when eigenvalue decomposition is performed on a matrix, a rank may be defined as the number of eigenvalues except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

In the description of the present document, 'rank' in MIMO transmission may indicate the number of paths for transmitting signals independently and 'number of layer(s)' may indicate the number of signal stream(s) transmitted via each path. Since a transmitting stage transmits layer amounting to the number of ranks used for signal transmission, a rank may have the same meaning of the number of layers unless mentioned especially.

DL Channel State Information (CSI) Feedback

MIMO system may be classified into an open-loop system or a closed-loop system. The open-loop system may mean that a transmitting stage performs MIMO transmission without feedback of channel state information from MIMO receiving stage. The closed-loop system may mean that a transmitting stage performs MIMO transmission with feedback of channel state information from MIMO receiving stage. According to the closed-loop MIMO system, each of the transmitting stage and the receiving stage may be able to perform beamforming based on the channel state information to obtain a multiplexing gain of MIMO transmitting antennas. In order for the receiving stage (e.g., user equipment) to feed back channel state information, the transmitting stage (e.g., base station) may be able to allocate a UL control channel or a UL shared channel to the receiving stage (e.g., user equipment).

Meanwhile, the fed-back channel state information (CSI) may include a rank indicator (RI), a precoding matrix index (PMI) and a channel quality indicator (CQI). First of all, the RI is the information on a channel rank. A rank of a channel may mean a maximum number of layers (or streams) capable of carrying different informations via the same time-frequency resource. Since a rank value is mainly determined by long-term fading of a channel, it may be generally fed back in a cycle longer than that of the PMI or the CQI (i.e., less frequently).

The PMI is the information on a precoding matrix used for transmission from a transmitting stage. Precoding means that a transmission layer is mapped to a transmitting antenna. By the precoding matrix, layer-to-antenna mapping relation may be determined. The PMI corresponds to a precoding matrix index of a base station preferred by a user equipment with reference to such a metric as a signal-to-interference plus noise ratio (hereinafter abbreviated SINR) and the like. In order to reduce feedback overhead of precoding information, a transmitting stage and a receiving stage share a codebook containing various precoding matrixes with each other in advance and an index indicating a specific precoding matrix in the corresponding codebook may be fed back only.

The CQI is the information indicating a channel quality or a channel strength. The CQI may be represented as a predetermined MCS combination. In particular, a fed-back CQI index indicates a corresponding modulation scheme and a corresponding code rate. Generally, the CQI becomes a value that reflects a reception SINR obtainable in case that a base station configures a spatial channel using PMI.

A system (e.g., LTE-A system) that supports an extended antenna configuration considers obtaining additional multiuser diversity using multiuser-MIMO (MU-MIMO) scheme. Since an interference channel between user equipments multiplexed in antenna domain exists in the MU-MIMO scheme, when a base station performs a DL transmission using channel state information fed back by one user equipment among multiple users, it may be necessary to prevent interference from occurring on other user equipments. Hence, in order to correctly perform MU-MIMO operation, it may be necessary to feed back channel state information having accuracy higher than that of a single user-MIMO (SU-MIMO) scheme.

Thus, in order to measure and repot more accurate channel state information, a new CSI feedback scheme of improving the previous CSI including RI, PMI and CQI may apply. For instance, precoding information fed back by a receiving stage may be indicated by a combination of 2 PMIs. One (i.e., 1$^{st}$ PMI) of the 2 PMIs has the attribute of long term and/or wideband and may be named W1. And, the other one (i.e., 2$^{nd}$ PMI) of the 2 PMIs has the attribute of short term and/or subband and may be named W2. And, a final PMI may be determined by a combination (or function) of W1 and W2. For instance, if a final PMI is set to W, it may define 'W=W1*W2' or 'W=W2*W1'.

In this case, W1 reflects average property on frequency and/or time of a channel. Namely, W1 may be defined as channel state information that reflects property of a long-term channel on time, a wideband channel on frequency, or a wideband channel on frequency with long term on time. In order to schematically represent the property of W1, W1 may be named channel state information of long term-wideband property (or long term-wideband PMI) in this specification.

On the other hand, W2 reflects relatively instantaneous channel property compared to W1. Namely, W2 may be defined as channel state information that reflects property of a short-term channel on time, a subband channel on frequency, or a subband channel on frequency with short term on time. In order to schematically represent the property of W2, W2 may be named channel state information of short term-subband property (or short term-subband PMI) in this specification.

In order to determine a final precoding matrix W from two different attribute informations (e.g., W1 and W2) indicating channel states, it may be necessary to configure a separate codebook (e.g., a 1$^{st}$ codebook for W1 and a 2$^{nd}$ codebook for W2) containing precoding matrixes indicating channel informations of attributes, respectively. And, a type of the codebook configured in this manner may be called a hierarchical codebook. If a codebook for a final use is determined using the hierarchical codebook, it may be called hierarchical codebook transformation.

For example of a hierarchical codebook transforming scheme, it may be able to transform a codebook using a long term covariance matrix of a channel shown in Formula 12.

$$W = \mathrm{norm}(W1\,W2) \quad \text{[Formula 12]}$$

In Formula 12, W1 (long term-wideband PMI) indicates an element (i.e., codeword) configuring a codebook (e.g., 1$^{st}$ codebook) prepared to reflect channel information of long term-wideband attribute. In particular, the W1 corresponds to a precoding matrix contained in the 1$^{st}$ codebook that reflects the channel information of the long term-wideband attribute. Meanwhile, W2 (short term-subband PMI) indicates an element (i.e., codeword) configuring a codebook (e.g., 2$^{nd}$ codebook) prepared to reflect channel information of short term-subband attribute. In particular, the W2 corresponds to a precoding matrix contained in the 2$^{nd}$ codebook that reflects the channel information of the short term-subband attribute. And, the W indicates a codeword of a final codebook. Moreover, 'norm (A)' indicates a matrix in which a norm per column of matrix A is normalized into 1.

The W1 and W2 may have the configurations shown in Formula 13.

$$W1(i) = \begin{bmatrix} X_i & 0 \\ 0 & X_i \end{bmatrix} \quad \text{[Formula 13]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r\ \text{columns}}$$

(if rank = $r$)

In Formula 13, W1 may be defined as a block diagonal matrix type and each block is an identical matrix Xi. One block Xi may be defined as (Nt/2)×M matrix. In this case, Nt indicates the number of transmitting antennas. In Formula 13, $e_M^p$ (p=k, l, ..., m) of W2 is M×1 vector and indicates a vector including M vector components, in which p$^{th}$ component among the M vector components is 1 and the rest of the components are zero. If $e_M^p$ is multiplied by W1, since p$^{th}$ column is selected from columns of the W1, this vector may be called a selection vector. In this case, if a value of M increases, the number of vectors fed back at a time to represent a long term/wideband channel increases. Hence, feedback accuracy is raised. Yet, the bigger the M value becomes, the smaller a codebook size of W1 fed back in low frequency gets but the larger a codebook size of W2 fed back in high frequency gets. Hence, feedback overhead increases eventually. In particular, tradeoff exists between the feedback overhead and the feedback accuracy. Thus, it may be able to determine the M value in a manner that the feedback overhead is set not to increase excessively by maintaining the feedback accuracy appropriately. Meanwhile, $\alpha_j$, $\beta_j$ and $\gamma_j$ indicate prescribed phase values, respectively. In Formula 13, k, l and m are integers, respectively (where 1≤k, l, m≤M).

The codebook structure in Formula 13 is designed to appropriately reflect channel correlation property generated in case that an inter-antenna space is dense in using cross-polarized (X-pol) configuration (generally, a case that a distance between adjacent antennas is a half of signal wavelength). For instance, the cross-polarized antenna configuration may be represented as Table 1.

TABLE 1

| 2Tx cross-polarized antenna configuration |  |
| --- | --- |
| 4Tx cross-polarized antenna configuration | 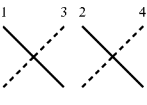 |
| 8Tx cross-polarized antenna configuration | 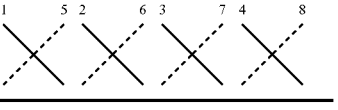 |

In Table 1, 8Tx cross-polarized configuration can be represented as configured with 2 orthogonally polarized antenna groups. In particular, antennas 1, 2, 3 and 4 of a $1^{st}$ antenna group may have the same polarization (e.g., vertical polarization), while antennas 5, 6, 7 and 8 of a $2^{nd}$ antenna group may have the same polarization (e.g., horizontal polarization). And, the two antenna groups are co-located. For instance, the antenna 1 and the antenna 5 are installed at the same location, the antenna 2 and the antenna 6 are installed at the same location, the antenna 3 and the antenna 7 are installed at the same location, and the antenna 4 and the antenna 8 are installed at the same location. In other words, antennas of one antenna group have the same polarization like ULA (uniform linear array) and inter-antenna correlation in one antenna group has the property of linear phase increment. And, correlation between antenna groups has property of phase rotation.

Since a codebook corresponds to a value resulting from quantizing a channel, it may be necessary to design a codebook by reflecting property of a real channel as it is. Thus, in order to describe that the real channel property is appropriately reflected by the codeword of the codebook designed as Formula 13, a rank 1 codebook is exemplarily explained as follows. Formula 14 shows one example of determining a final codeword W as a multiplication of a codeword W1 and a codeword W2 in case of rank 1.

$$W1(i)*W2(j) = \begin{bmatrix} X_i(k) \\ \alpha_j X_i(k) \end{bmatrix} \quad \text{[Formula 14]}$$

In Formula 14, a final codeword is represented as Nt×1 vector and structured with 2 vectors including an upper vector $X_i(k)$ and a lower vector $\alpha_j X_i(k)$. The upper vector $X_i(k)$ indicates correlation property of a horizontally polarized antenna group of cross-polarized antennas and the lower vector $\alpha_j X_i(k)$ indicates correlation property of a vertically polarized antenna group of the cross-polarized antennas. And, the $X_i(k)$ may be represented as a vector (e.g., DFT matrix) having linear phase increment by reflecting inter-antenna correlation property of each antenna group.

In case of using the above-mentioned codebook, channel feedback may have accuracy higher than that of a case of using a single codebook. Thus, single-cell MU-MIMO becomes possible using the channel feedback of the high accuracy. Due to similar reason, channel feedback of high accuracy is required for CoMP operation. For instance, in case of CoMP JT operation, since several base stations cooperatively transmit the same data to a specific user equipment (UE), it may be theoretically regarded as MIMO system in which a plurality of antennas are geographically distributed. In particular, when MIMO operation is performed in JT, like the single-cell MU-MIMO, high-level accuracy of channel information may be requested to avoid interference between co-scheduled user equipments. Moreover, in case of CoMP CB operation, accurate channel information is requested to avoid interference given to a serving cell by a neighbor cell.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting and receiving data using multiple antennas (MIMO), a channel status between a transmitting antenna and a receiving antenna should be obtained to receive a correct signal. Hence, a separate reference signal needs to be present for each transmitting antenna.

In the conventional wireless communication system (e.g., 3GPP LTE Release-8, 3GPP LTE Release-9, etc.), downlink reference signals may be defined to include a common reference signal (CRS) shared with all user equipments in a cell and a dedicated reference signal (DRS) for a specific user equipment only. By these reference signals, information for channel estimation and demodulation can be provided.

A receiving side (e.g., a user equipment) estimates a state of a channel from CRS and may be able to feed back such an indicator related to a channel quality as CQI (Channel Quality Indicator), PMI (Precoding Matrix Index) and RI (Rank Indicator) to a transmitting side (e.g., base station). The CRS may be called a cell-specific reference signal. An RS related to feedback of such channel state information (CSI) as CQI/PMI/RI can be separately defined as CSI-RS.

DRS may be transmitted on a corresponding RE if demodulation of data on PDSCH is necessary. A user equipment many be informed of a presence or non-presence of DRS by an upper layer. In particular, the user may be informed that the DRS is valid only if the corresponding PDSCH is mapped. The DRS may be called a UE-specific reference signal or a demodulation reference signal (DMRS).

In order to support spectral efficiency higher than that of the conventional 3GPP LTE (e.g., LTE Release-8, LTE Release-9, etc.) system, it is able to design a system (e.g., LTE-A (LTE-Advanced)) system having an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the conventional antenna configuration and it may be necessary to design a new reference signal pattern for an additional antenna configuration. In this case, if CRS for a new antenna port is added to a system having a conventional antenna configuration, it is disadvantageous in that a reference signal overhead rapidly increases to lower a data rate. In consideration of this matter, a separate reference signal (CSI-RS) for a channel state information (CSI) measurement for the new antenna port may be introduced into LTE-A (LTE-advanced) system evolved from 3GPP LTE.

Meanwhile, LTE-A system is considering MIMO of high order, multi-cell transmission, evolved MU-MIMO and the like. In order to support an efficient operation of a reference signal and an evolved transmission scheme, DMRS based data modulation is being taken into consideration. In particular, it is able to define DMRS for at least two layers to support a data transmission via additional antennas separately from DMRS (antenna port index 5) for the rank-1 beamforming defined in the conventional 3GPP LTE (e.g., Release-8).

Figure 7:
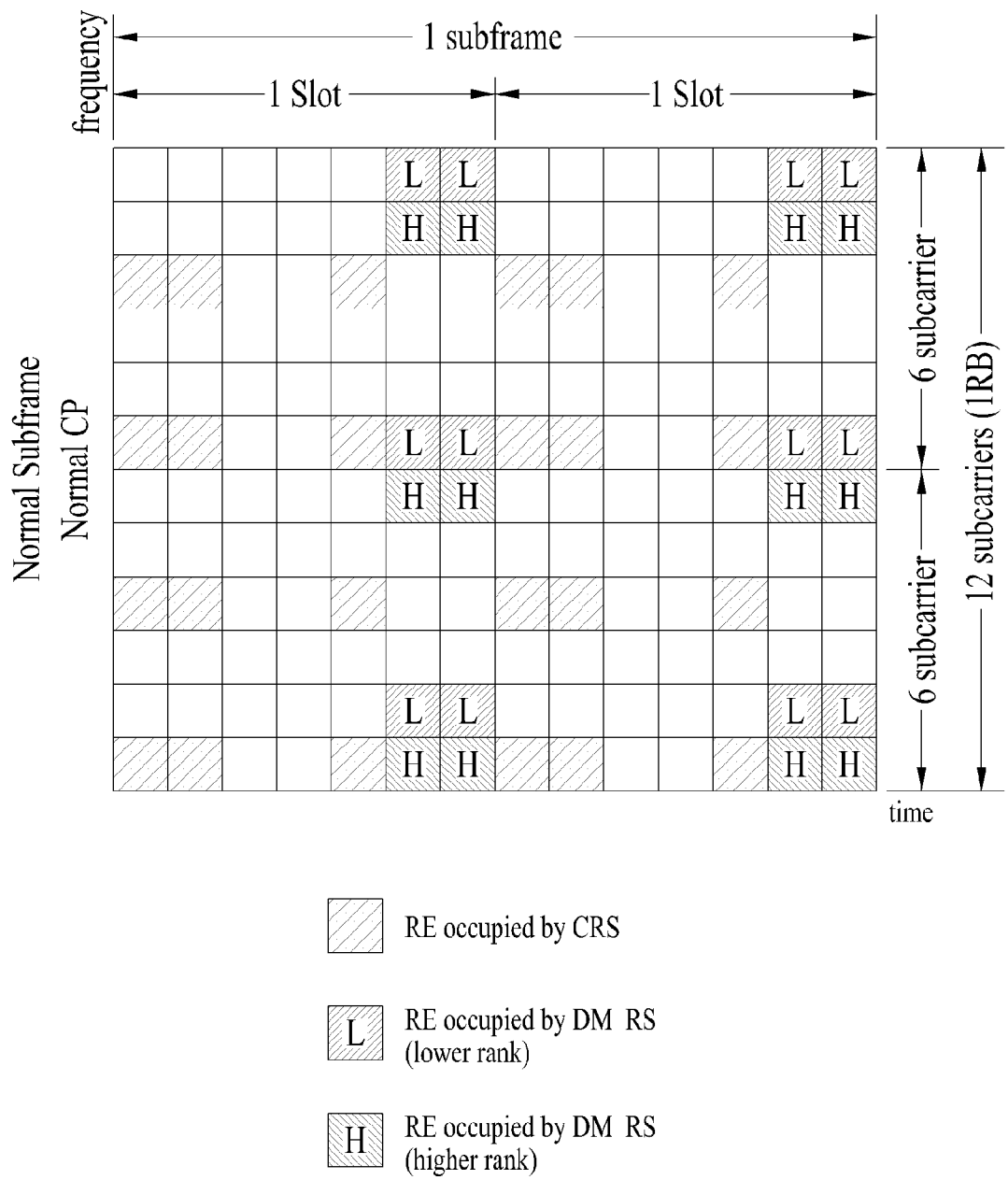
FIG. 7 is a diagram for one example of DMRS pattern defined by LTE-A.

FIG. 7 is a diagram for one example of DMRS pattern defined by LTE-A. The DMRS pattern defined in FIG. 7 indicates a resource element position, to which DMRS is mapped, in one resource block (RB) pair (e.g., 14 OFDM symbols×12 subcarriers) in a normal CP subframe.

Referring to FIG. 7, if a rank of PDSCU is 1 or 2, total 12 REs (i.e., REs denoted by 'L' in FIG. 7) in one RB pair are used for DMRS transmission [i.e., DMRS overhead is 12 REs/RB/subframe]. And, DMRS for layer 1 and DMRS for layer 2 can be multiplexed by CDM scheme using an orthogonal code having a spreading factor set to 2. In particular, since the DMRS for the layer 1 and the DMRS for the layer 2 spread on a time axis and total 4 REs are used for DMRS transmission on a single subcarrier, the DMRS for the layer 1 and the DMRS for the layer 2 are repeated on a blot boundary. In particular, the DMRS for the layer 1 and the DMRS for the layer 2 are mapped onto the same RE and can be discriminated from each other by the orthogonal code (OC) multiplied in the time domain (i.e., across OFDM symbols).

In the example shown in FIG. 7, if a rank of PDSCH is 3 or higher, DMRS is transmitted using 12 REs (e.g., REs denoted by 'H' in FIG. 7) additionally. And, total DMRS overhead becomes 24 REs/RB/subframe. DMRS for a layer 3 and DMRS for a layer 4 can be multiplexed with the DMRS for the layer 1 and the DMRS for the layer 2 by FDM scheme. In particular, a subcarrier having the DMRS for the layer 3 or 4 mapped thereto is different from a subcarrier having the DMRS for the layer 1 or 2 mapped thereto. And, the DMRS for the layer 3 and the DMRS for the layer 4 can be multiplexed in time domain by CDM using a spreading factor set to 2.

In case of a rank 5 or higher, additional REs except the REs used for the case of the ranks 1 to 4 are not used for the DMRS for the layers 5 to 8 [i.e., DMRS overhead is 24 REs/RB/subframe in case of the rank 3, 4, 5, 6, 7 or 8]. Yet, the RE, to which the DMRS of the layer 1, 2, 3 or 4 is mapped, is reused. If DRMSs for the layers 5 to 8 are multiplied by an orthogonal code having a spreading factor set to 4 on a time axis, they can be discriminated from the DMRS for the layer 1, 2, 3 or 4 by CDM scheme. For instance, the DMRS for the layer 5/7 can be mapped onto the same RE (e.g., the RE denoted by 'L' in FIG. 7) to which the DMRS for the layer 1/2 is mapped. And, the DMRS for the layer 6/8 can be mapped onto the same RE (e.g., the RE denoted by 'H' in FIG. 7) to which the DMRS for the layer 3/4 is mapped. In this case, the DMRS for the layer 1/2/5/7 can be discriminated by CDM scheme in time domain, the DMRS for the layer 3/4/6/8 can be discriminated by CDM scheme in time domain, and the DMRS for the layer 1/2/5/7 can be discriminated from the DMRS for the layer 3/4/6/8 by FDM scheme.

For instance, the DMRS for the layer 1 may spread into the orthogonal code [+1 +1 +1 +1] of a spreading factor 4 at 4 REs on one subcarrier. In order to maintain the orthogonality with the DMRS for the layer 1, the DMRS for the layer 5 may spread into orthogonal code [+1 +1 −1 −1] of a spreading factor 4. In other words, the orthogonal code applied to the DMRS for the layer 5/6/7/8 may use a code, which is adjusted (i.e., phase-inverted) to have a phase difference set to 180 degrees on a slot boundary (i.e., in a $1^{st}$ slot and a $2^{nd}$ slot) using an orthogonal code of a spreading factor 2, to maintain the orthogonality despite using the same RE of the DMRS for the layer 1/2/3/4.

Table 2 shows the spreading codes applied to the aforementioned DMRS patterns.

TABLE 2

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 2, antenna ports (p) 7 to 14 indicate logical antennas (i.e., antenna ports) via which DMRSs for PDSCH transmitted layers 1 to 8 are transmitted, respectively. The DMRS for the antenna ports 7, 8, 11 and 13 are mapped to the same 12 REs (i.e., REs denoted by 'L' in FIG. 7). And, the DMRS for the antenna ports 9, 10, 12 and 14 can be mapped to another same 12 REs (i.e., REs denoted by 'L' in FIG. 7).

DMRS in Multi-Cell Operation

In the following description, in case of performing a multi-cell operation (e.g., CoMP operation), DMRS transmitting methods according to various embodiments of the present invention are explained.

First of all, the case of transmitting a multi-layer signal in a single-cell includes both SU-MIMO case that the multi-layer signal is for a single UE and MU-MIMO case that the multi-layer signal is for different UEs. In any cases, the multi-layer transmission preferably maintains orthogonality between DMRSs of the respective layers. Namely, although interference from another layer is put on a data transmitted RE, it can be removed by appropriate reception beamforming. Yet, in order to perform the appropriate reception beamforming, it is necessary to perform accurate channel estimation by receiving interference-free DMRS (or DMRS receiving les interference).

Although the aforementioned DMRS is designed to maintain the orthogonality for the multi-layer transmission in a single-cell, it is not able to secure that the orthogonality is maintained for a multi-cell operation. In this case, if the orthogonality of DMRS for the multi-layer transmission is not maintained in the multi-cell operation using the DMRS, it may have difficulty in receiving data (PDSCH) accurately.

For instance, in case of performing CoMP operation using DMRS, when a prescribed UE receives DMRS from a serving cell and DMRS from a neighbor cell, orthogonality between the DMRS from the serving cell and the DMRS from the neighbor cell may not be maintained. For instance, assume that each of a cell 1 and a cell 2 participating in CoMP performs a CP operation for reducing inter-cell interference while transmitting PDSCH of a rank 2. In doing so, each of a UE 1, which receives a signal of a layer 1 and a layer 2 while served by the cell 1, and a UE 2, which receives a signal of a layer 1 and a layer 2 while served by the cell 2, extracts DMRS using the same spreading code sequence (cf. Table 2) on the same RE and then performs channel estimation. Hence, DMRS orthogonality is not maintained, the DMRS from the cell 1 works as interference on the UE 2, and the DMRS from the cell 2 works as interference on the UE 1, whereby DMRS channel estimation performance in each of the UEs may be degraded.

Moreover, when a DMRS sequence is generated from a prescribed cell, since scrambling is performed using a scrambling sequence determined by a cell ID of the corresponding cell, a DMRS sequence of each cell is not identically generated. Yet, in case that different DMRS sequences are transmitted on the same RE using the same orthogonal code, DMRS of each cell may not be fully discriminated with a difference of a scrambling sequence applied to the corresponding DMRS. Hence, the DMRS of one cell continues to work as interference on the DMRS of another cell, whereby the problem of the DMRS channel estimation performance degradation is not solved still. Moreover, despite assuming that the DMRS of the cell 1 and the DMRS of the cell 2 use an orthogonal spreading code sequence on the same RE, since a scrambling sequence applied to the DMRS of each of the cells is different, the DMRS of one cell and the DMRS of another cell is not fully orthogonal to each other [i.e., compared to the DMRS orthogonality in case of applying an orthogonal spreading code sequence to a DMRS sequence generated based on the same seed value, the DMRS orthogonality in case of applying an orthogonal spreading code sequence to a DMRS sequence generated based on a different seed value is relatively low.].

Besides, when the cell 1 is a macro cell having a relatively high transmit power and the cell 2 is a pico cell having a relatively low transmit power, although CoMP CB operation is smoothly operated, if DMRS of the cell 2 receives considerably strong interference from the DMRS of the cell 1 due to the power difference between the two cells, the DMRS channel estimation performance may be lowered.

In the following description, various embodiments of the present invention for maintaining inter-cell DMRS orthogonality in a multi-cell operation are explained.

1$^{st}$ Embodiment

The present embodiment relates to a method of informing a user equipment that which seed value is the seed value used for DMRS sequence generation in a multi-cell operation by selecting one from a plurality of predefined seed values.

As mentioned in the foregoing description, although a spreading code sequence applied to DMRS of a 1$^{st}$ cell and a spreading code sequence applied to DMRS of a 2$^{nd}$ cell are orthogonal to each other, if a seed value used for the generation of a DMRS sequence of the 1$^{st}$ cell and a seed value used for the generation of a DMRS sequence of the 2$^{nd}$ cell are difference from each other, it is unable to maintain the inter-cell DMRS orthogonality. On the contrary, according to the present embodiment, DMRS is generated and transmitted from each of a 1$^{st}$ cell and a 2$^{nd}$ cell using the same seed value and a base station is able to inform a user equipment what is a seed value used for the DMRS generation. In case that the same seed value is used for the DMRS generation of each of the 1$^{st}$ and 2$^{nd}$ cells, scrambling sequences of the DMRSs of the 1$^{st}$ and 2$^{nd}$ cells are identical to each other. Hence, it is able to achieve the orthogonality of the DMRS of each of the cells through another resource (e.g., an orthogonal spreading code, a subcarrier, etc.).

According to the present embodiment, a base station informs a user equipment of a plurality of seed values in advance and is then able to dynamically inform the user equipment that a seed value used for the generation of a DMRS sequence corresponds to which one of a plurality of the seed values. For instance, the base station can indicate a plurality of the seed values through upper layer signaling or the like in advance and is also able to indicate what seed value is used for the generation of DMRS related to a PDSCH transmission of a corresponding subframe through PDCCH in each subframe. Hence, since it is able to provide DMRS generated on the basis of the same seed value in a multi-cell, inter-cell DMRS orthogonality can be maintained.

A seed value used for the generation of DMRS may include a cell identifier (ID) for example. In particular, the generation of a DMRS sequence r(m) for one of antenna ports 7 to 14 can be defined as Formula 15 for example.

$$r(m) = \frac{1}{\sqrt{2}}(1 - 2 \cdot c(2m)) + j\frac{1}{\sqrt{2}}(1 - 2 \cdot c(2m+1)) \quad \text{[Formula 15]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Formula 15, $N_{RB}^{max,DL}$ is the value indicating a maximum DL bandwidth setting and means the maximum number of RBs in DL. In Formula 15, a pseudo-random sequence c(i) can be defined by a length-31 gold sequence. The generation of the above-mentioned pseudo-random sequence can be initialized at the beginning of each subframe. The pseudo-random sequence can be generated by a determined formula, and more particularly, a pseudo-random sequence having a specific length can be generated based on an initial value ($C_{init}$ applying to the determined formula. For instance, the initial value ($C_{init}$) can be defined as Formula 16.

$$c_{init} = (\lfloor n_s/2 \rfloor + 1) \cdot (2N_{ID}^{cell} + 1) \cdot 2^{16} + n_{SCID} \quad \text{[Formula 16]}$$

In Formula 16, the $n_s$ indicates a slot number (or a slot index) within a radio frame, the $N_{ID}^{cell}$ indicates a physical layer cell identifier, the $n_{SCID}$ indicates a scrambling identifier, and a value of the $n_{SCID}$ is 0 unless defined specially. Namely, at the same slot position of the same subframe, an initial value $C_{init}$ has a different value in accordance with value a value of the $N_{ID}^{cell}$ or a value of the $n_{SCID}$. Since a pseudo-random sequence is determined in accordance with the $C_{init}$ and a DMRS sequence is generated using the pseudo-random sequence, the DMRS sequence may be eventually determined depending on the value of the $N_{ID}^{cell}$ or the value of the $n_{SCID}$. If no special determination made on the $n_{SCID}$ in the same slot (i.e., $n_{SCID}$=0), the DMRS sequence in accordance with the value of $N_{ID}^{cell}$ may be one example of the seed value of the present invention.

According to the present embodiment, a base station participating in a multi-cell operation has at least two seed values (e.g., at least two cell IDs) used for DMRS generation. And, the base station can inform a UE what cell ID will be used for the UE to decode PDSCH. In this case, the cell ID to be used by the UE in decoding the PDSCH means a cell ID used for the DMRS generation. In particular, the UE estimates a channel through a received DMRS and then performs PDSCH decoding based on the estimated channel. In doing so, the UE is unable to correctly receive the DMRS unless knowing a cell ID used by the base station for the generation of a DMRS sequence.

A cell ID, which is one example of a seed value for DMRS generation, proposed by the present embodiment can be represented as an identifier of a virtual cell, whereas a related art cell ID plays a role as one identifier unique to each physical cell. A user equipment (UE) can obtain the related art cell ID through a synchronization signal and a legacy channel such as a CRS scrambling sequence and the like. For example of a seed value for DMRS generation of the present embodiment, a cell ID (virtual cell ID) can be provided to a UE by a base station through a physical control channel (e.g., PDCCH) and/or an upper layer signaling (e.g., RRC (radio resource control) signaling). In this case, it is able to configure a plurality of virtual cell IDs. And, the virtual cell ID may be identical to a cell ID of a neighbor cell joining a multi-cell operation.

For instance, in case that a $1^{st}$ cell and a $2^{nd}$ cell perform a multi-cell operation, a user equipment can be informed of cell IDs of the $1^{st}$ and $2^{nd}$ cells. In this case, the user equipment basically served by the $1^{st}$ cell can acquire the cell ID of the $1^{st}$ cell by the related art method (e.g., synchronization signal, CRS, etc.) and can acquire the cell ID of the $2^{nd}$ cell by RC signaling. Subsequently, a base station can indicate what kind of cell Ill is used for the generation of DMRS, which is transmitted in a corresponding subframe, in each subframe via PDCCH. For instance, the base station defines a prescribed indicator indicating a prescribed one of a plurality of cell IDs and then transmitting the defined indicator on PDCCH, thereby indicating what kind of cell ID is used for DMRS sequence generation.

According to the present embodiment, a cell ID is taken as an example of a seed value used for DMRS generation, by which the present invention may be non-limited. In particular, in case that a seed value is set to another element used for the generation of a DMRS sequence, the principle of the present invention can be identically applied.

$2^{nd}$ Embodiment

The present embodiment relates to a method of configuring a code or frequency resource applied to DMRS in a multi-cell operation.

In a related art wireless communication system, a DMRS mapped RE position (cf. FIG. 7) and an orthogonal spreading code (cf. Table 2) for each of layers 1 to 8 (or antenna ports 7 to 14) are fixed according to predetermination. Yet, according to the present embodiment, when a prescribed one of base stations joining a multi-cell operation transmits DMRS, it is able to configure a DMRS mapped RE position for each layer (or antenna port) and/or a spreading code applied to the DMRS. In particular, when a base station transmits a DMRS for a prescribed layer (or antenna port), the base station determines an RE position and/or an orthogonal spreading code, which are different from a previously determined RE position and a previously determined orthogonal spreading code, respectively, informs a user equipment of the different RE position and/or the different orthogonal spreading code, and then transmits the DMRS correspondingly, thereby enabling the user equipment to correctly receive the DMRS. In order for the base station to inform the user equipment of the DMRS configuration, it is able to use a physical layer channel (e.g., PDCCH) and/or an upper layer signaling (e.g., RRC signaling). For instance, after an indicator related to the DMRS configuration has been defined, if a value of the corresponding indicator is set to a $1^{st}$ value, the configuration for a previous DMRS RE and/or a previous orthogonal spreading code is applied. If the value of the corresponding indicator is set to a $2^{nd}$ value, a configuration changed for a DMRS RE and/or an orthogonal spreading code is applied.

According to the previous DMRS RE configuration, DMRS for layers 1, 2, 5 and 7 (or antenna ports 7, 8, 11 and 13) are mapped to DMRS RE (e.g., RE denoted by 'L' in FIG. 7) for a low rank in the example shown in FIG. 7 and DMRS for layers 3, 4, 6 and 8 (or antenna ports 9, 10, 12 and 14) are mapped to DMRS RE (e.g., RE denoted by 'II' in FIG. 7) for a high rank in the example shown in FIG. 7. According to the present embodiment, in case that a changed DMRS RE configuration is applied (e.g., in case that a DMRS related indicator is set to a specific value), when a DMRS transmission of a corresponding cell, the DMRS for the layers 1 and 2 (or antenna port 7 and 8) can be transmitted on the RE denoted by 'H' in FIG. 7. In particular, for $1^{st}$ and $2^{nd}$ cells joining a multi-cell operation, the $1^{st}$ cell can transmit the DMRS for the layers 1 and 2 (or antenna ports 7 and 8) at an original position (e.g., the RE denoted by 'L' in FIG. 7), while the $2^{nd}$ cell can transmit the DMRS for the layers 1 and 2 (or antenna ports 7 and 8) at a changed position (e.g., the RE denoted by 'H' in FIG. 7). Hence, the DMRS of the $1^{st}$ cell and the DMRS of the $2^{nd}$ cell can be discriminated from each other in frequency domain and the orthogonality between the DMRS of the $1^{st}$ cell and the DMRS of the $2^{nd}$ cell can be maintained in the multi-cell operation.

Together with or separately from the above-described DMRS RE configuration, in the multi-cell operation, the $1^{st}$ cell can use the previous DMRS orthogonal spreading sequence (cf. Table 2) as it is and the $2^{nd}$ cell can use a DMRS orthogonal spreading code sequence different from the previous one. For instance, in case that the changed DMRS orthogonal spreading code configuration is applied (e.g., a DMRS related indicator is set to a specific value), the corresponding cell can use the spreading codes (i.e., [+1 +1 −1 −1] for the layer 1 and [+1 −1 −1 +1] for the layer 2), which result from phase-inverting the DMRS orthogonal spreading code [+1 +1 +1 +1] applied to the layer 1 (or antenna port 7) and the DMRS orthogonal spreading code [+1 −1 +1 −1] applied to the layer 2 (or antenna port 8) on a slot boundary, respectively (i.e., adjusted to have a phase difference become 180 degrees. Hence, the spreading code applied to the DMRS for the layers 1 and 2 of the $1^{st}$ cell and the spreading code applied to the DMRS for the layers 1 and 2 of the $2^{nd}$ cell can be configured to be orthogonal to each other. According to a principle similar to the above principle, for the layers 3 to 8 (or antenna ports 9 to 14), compared to the previous configuration, a result from inverting a phase of an orthogonal spreading code applied to DMRS on a slot boundary (i.e., a result of multiplying a spreading code applied to a $2^{nd}$ slot by −1 while a spreading code applied to a $1^{st}$ slot is maintained intact) can be defined as a changed DMRS orthogonal spreading code configuration.

As mentioned in the foregoing description, the configuration of inverting the phase of the spreading code for the DMRS on the slot boundary can be represented as re-coordinating the mapping relation between the previous DMRS antenna port and the previous spreading code, which is proposed by Table 2. In particular, the changed DMRS orthogonal spreading sequence configuration can be expressed as a form of swapping the spreading code applied to the layers 1 and 2 (or antenna ports 7 and 8) and the spreading code applied to the layers 5 and 7 (or antenna ports 11 and 13) according to the previous DMRS configuration for each other. Likewise, the changed DMRS orthogonal spreading sequence configuration can be expressed as a form of swapping the spreading code applied to the layers 3 and 4 (or antenna ports 9 and 10) and the spreading code applied to the layers 6 and 8 (or antenna ports 12 and 14) according to the previous DMRS configuration for each other. This can be summarized into Table 3.

TABLE 3

| Antenna port p | $[\overline{w}_p(0)\ \overline{w}_p(1)\ \overline{w}_p(2)\ \overline{w}_p(3)]$ |
|---|---|
| 7 | [+1 +1 −1 −1] |
| 8 | [+1 −1 −1 +1] |
| 9 | [−1 −1 +1 +1] |
| 10 | [−1 +1 +1 −1] |
| 11 | [+1 +1 +1 +1] |
| 12 | [+1 +1 +1 +1] |
| 13 | [+1 −1 +1 −1] |
| 14 | [+1 −1 +1 −1] |

$3^{rd}$ Embodiment

The present embodiment relates to a method of combining the aforementioned $1^{st}$ embodiment and the aforementioned $2^{nd}$ embodiment with each other. According to the present embodiment, orthogonality between DMRSs from a plurality of cells can be further secured.

For example, in case that a prescribed indicator related to DMRS configuration is set to a specific value, a base station can inform a user equipment that a DMRS sequence has been generated using a specific cell ID among cell IDs previously known to the user equipment by upper layer signaling or the like and is also able to inform the user equipment that a spreading code applied to the corresponding DMRS has a phase inverted in a $2^{nd}$ slot. Hence, since $1^{st}$ and $2^{nd}$ cells joining a multi-cell operation use the same scrambling sequence for the DMRS sequence and also use spreading codes orthogonal to each other, the orthogonality between DMRSs of the two cells can be definitely secured.

For another example, in case that a prescribed indicator related to DMRS configuration is set to a specific value, a base station can inform a user equipment that a DMRS sequence has been generated using a specific cell ID among cell IDs previously known to the user equipment by upper layer signaling or the like and is also able to inform the user equipment that a position of an RE, to which a corresponding DMRS is mapped, has been changed.

For a further example, the above-described two examples can be simultaneously applied.

In this case, the DMRS sequence generated using the cell ID indicated by the base station is identical to a DMRS sequence of a neighbor cell joining the multi-cell operation and the neighbor cell follows the previously defined DMRS configuration as it is (i.e., the neighbor cell generates a DMRS sequence using its physical cell ID and transmits DMRS without applying phase inversion of DMRS spreading code and changing DMRS RE). Hence, in the multi-cell operation, orthogonality of DMRSs from a plurality of cells can be maintained.

The present invention describes a CoMP operation for example of a multi-cell operation, by which the present invention may be non-limited. For instance, in an inter-cell interference coordination (ICIC) operation, in order to remove (or alleviate) interference on DMRS of a neighbor cell from a DMRS transmission of one cell, it is able to apply the DMRS configurations (e.g., the configuration of a seed value for DMRS sequence generation, the configuration of DMRS transmitted RE, the configuration of orthogonal spreading code applied to DMRS, etc.) proposed by the present invention. In particular, the principle proposed by the present invention may be applicable as a method of maintaining inter-cell DMRS orthogonality in various multi-cell environments.

Figure 8:
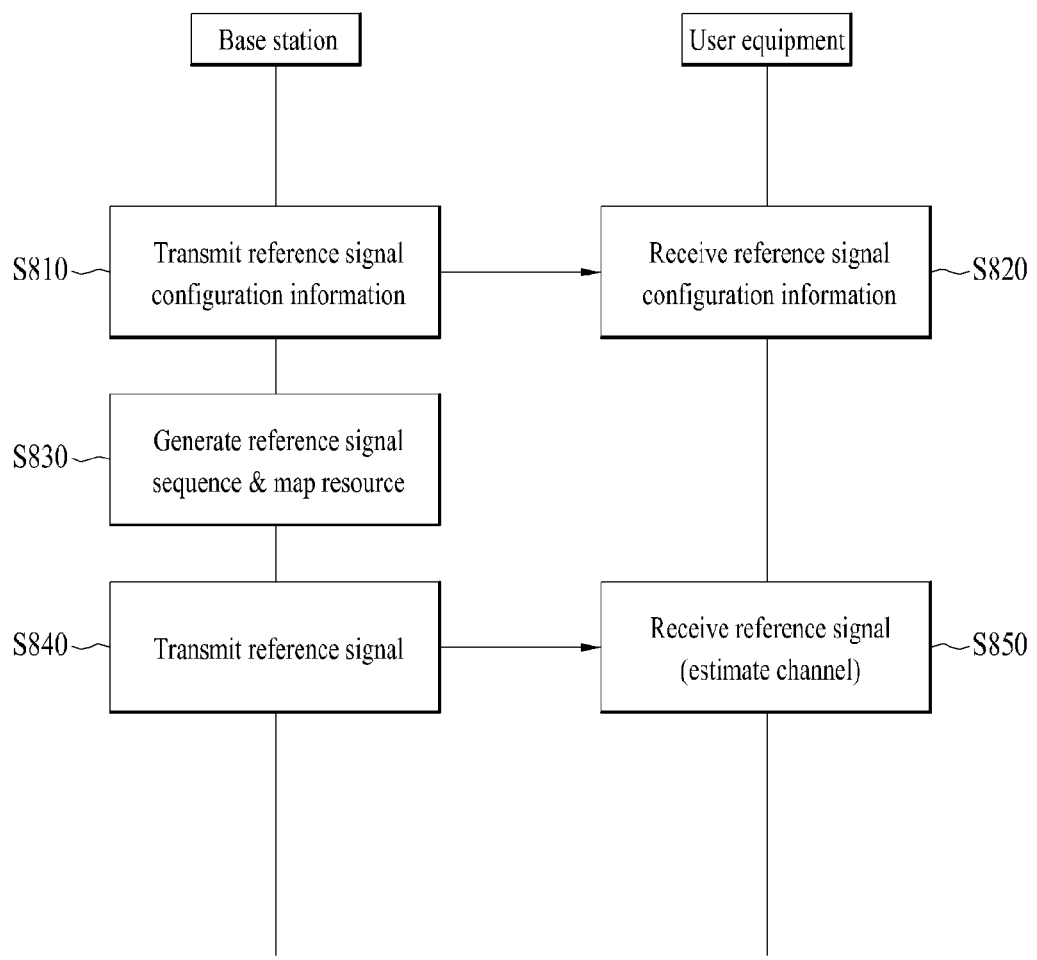
FIG. 8 is a flowchart for a reference signal transceiving method according to one embodiment of the present invention.

FIG. 8 is a flowchart for a reference signal transceiving method according to one embodiment of the present invention.

In a step S810, a base station generates configuration information of a DL reference signal (e.g., DMRS) and is then able to transmit the configuration information to a user equipment. In a step S820, the user equipment can receive the reference signal configuration information.

The reference signal configuration information may include an information on a seed value used for DMRS sequence generation, an information on a position of a resource element having a reference signal mapped thereto and/or an information on a spreading code sequence applied to the reference signal. Thus, the reference signal configuration information may be defined as a set of the above-mentioned various related informations. In case of a reference signal transmission of a related art, since the above-mentioned reference signal configuration information is previously determined and agreed between a base station and a user equipment, a separate signaling for the reference signal configuration information is not necessary. Yet, according to the present invention, since a reference signal configuration different from a general reference signal configuration may be applicable to maintain the orthogonality of a reference signal in a multi-cell operation, a signaling of the reference signal configuration is necessary.

In the step S810 and the step S820, the transmission of the reference signal configuration information may be performed though a physical layer channel and/or an upper layer signaling. Moreover, after a plurality of candidates for the reference signal configuration have been determined in advance, it is able to semi-statically inform the user equipment of the information on the candidates through an upper layer signaling. And, one reference signal configuration information (i.e., a reference signal configuration to be applied to a reference signal to be transmitted) selected from a plurality of the candidates can be dynamically provided to the user equipment via a physical layer channel. Thus, the reference signal configuration information may be defined as an indicator indicating a specific state. Moreover, although the reference signal configuration information may be explicitly provided, it is able to apply an implicit signaling method for a user equipment to indirectly derive a reference signal configuration information from another configuration information. In any cases, the base station exactly provides the user equipment with the information related to the reference signal configuration.

In a step S830, the base station generates a reference signal sequence in accordance with the reference signal configuration information and is then able to map it onto a DL resource. For instance, a seed value included in the reference signal configuration information may be usable for the reference signal sequence generation. Moreover, when a reference signal is mapped to a DL resource, information indicating that a reference signal for a prescribed antenna port will be mapped at a prescribed RE position or an information indicating that a prescribed orthogonal spreading code will be applied to a reference signal for a prescribed antenna port may follow a value included in the reference signal configuration information.

A reference signal configuration information of one cell is configured to provide the orthogonality between a reference signal of the corresponding cell and a reference signal of a neighbor cell. To this end, a seed value related to a generation of to reference signal sequence may have the same value of a cell identifier of the neighbor cell. A position of a resource element, to which a reference signal for a prescribed antenna port of the one cell may include a subcarrier position different from a resource element to which a reference signal for the same antenna port of the neighbor cell. A spreading code applied to a reference signal for a prescribed antenna port of the one cell may include a spreading code having a phase inverted on a slot boundary, compared to a spreading code applied to a reference signal for the same antenna port of the neighbor cell.

In a step S840, the base station can transmit a reference signal to the user equipment. In a step S850, the user equipment can receive the reference signal. Having received the reference signal, the user equipment can perform channel estimation. For instance, having received DMRS, the user equipment estimates a DL channel from the received DMRS and is then able to perform demodulation of PDSCH based on the estimated channel.

In the reference signal transmitting and receiving method according to the present invention described with reference to FIG. 8, the matters described in the various embodiments of the present invention may be independently applied or implemented in a manner of applying at least two embodiments simultaneously. And, the redundant contents shall be omitted for clarity.

Figure 9:
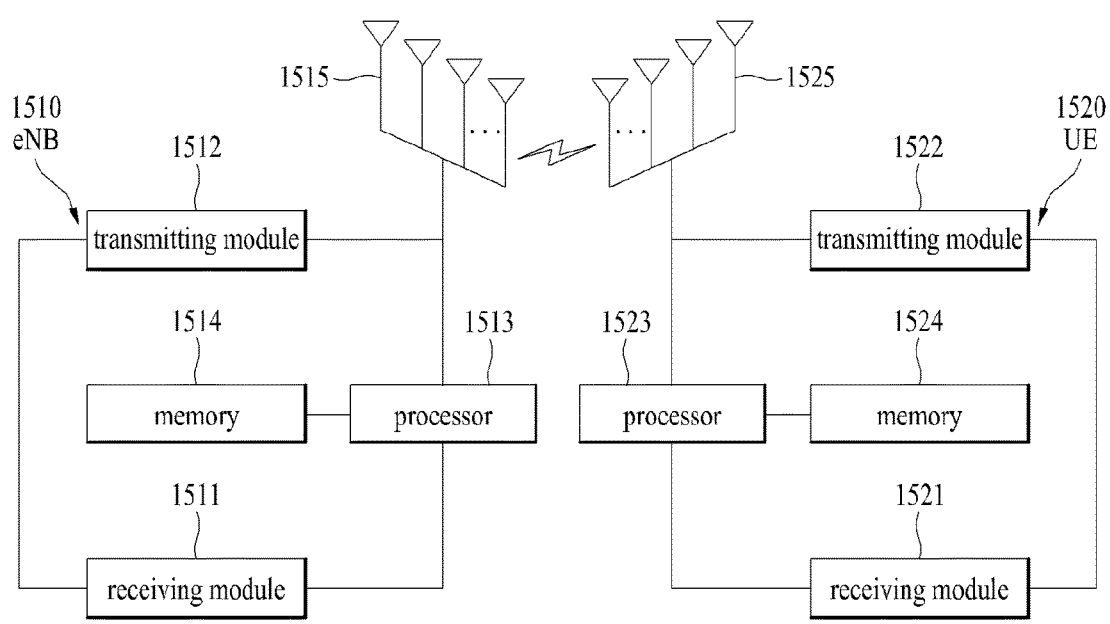
FIG. 9 is a diagram for configurations of a base station device and a user equipment device according to the present invention.

FIG. 9 is a diagram for configurations of a base station device and a user equipment device according to the present invention.

Referring to FIG. 9, a base station device 910 according to the present invention may include a receiving module 911, a transmitting module 912, a processor 913, a memory 914 and a plurality of antennas 915. In this case, a plurality of the antennas 915 may mean a base station device that supports MIMO transmission and reception. The receiving module 911 may receive various signals, data and informations in uplink from a user equipment. The transmitting module 912 may transmit various signals, data and informations in downlink to the user equipment. And, the processor 913 may control overall operations of the base station device 910.

The base station device 910 according to one embodiment of the present invention may be configured to transmit a reference signal. The processor 913 of the base station device may be configured to transmit a reference signal configuration information to the user equipment via the transmitting module. And, the processor 913 may be configured to generate a sequence of the reference signal according to the reference signal configuration information and map it onto a DL resource. Moreover, the processor 913 may be configured to transmit the mapped reference signal to the user equipment via the transmitting module.

The processor 913 of the base station device 910 may perform a function of operating and processing information received by the base station device 910, information to be transmitted externally by the base station device 910 and the like. And, the memory 914 may be able to store the operated and processed information and the like for prescribed duration and may be substituted with such a component as a buffer (not shown in the drawing) and the like.

Referring to FIG. 9, a user equipment device 920 according to the present invention may include a receiving module 921, a transmitting module 922, a processor 923, a memory 924 and a plurality of antennas 925. In this case, a plurality of the antennas 925 may mean a user equipment device that supports MIMO transmission and reception. The receiving module 921 may receive various signals, data and informations in downlink from a base station. The transmitting module 922 may transmit various signals, data and informations in uplink to the base station. And, the processor 923 may control overall operations of the user equipment device 920.

The user equipment device 920 according to one embodiment of the present invention may be configured to receive the reference signal. The processor 923 of the user equipment device may be configured to receive the reference signal configuration information from the base station via the receiving module. And, the processor 923 may be configured to receive the reference signal from the base station via the receiving module using the reference signal configuration information. In this case, a sequence of the reference signal is generated according to the reference signal configuration information, the reference signal can be transmitted to the user equipment from the base station by being mapped to a DL resource, and the processor 923 may be configured to perform a reception of the reference signal based on the reference signal configuration information.

The processor 923 of the user equipment device 920 may perform a function of operating and processing information received by the user equipment device 920, information to be transmitted externally by the user equipment device 920 and the like. And, the memory 924 may be able to store the operated and processed information and the like for prescribed duration and may be substituted with such a component as a buffer (not shown in the drawing) and the like.

Regarding the detailed configurations of the base station device and the user equipment device, the matters described in the various embodiments of the present invention may be independently applied or implemented in a manner of applying at least two embodiments simultaneously. And, the redundant contents shall be omitted for clarity.

The details of the base station device 910 in the description with reference to FIG. 9 may be identically applicable to a relay node as a DL transmission subject or a UL reception subject. And, the details of the user equipment device 920 in the description with reference to FIG. 9 may be identically applicable to a relay node as a DL reception subject or a UL transmission subject.

The above-described embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the above-mentioned embodiments of the present invention are applicable to various kinds of mobile communication systems.

What is claimed is:

1. A method of transmitting a reference signal by an eNodeB including a first cell and a second cell performing Coordinated Multi Point (CoMP) transmission the method comprising:
   transmitting, through the first cell to a user equipment (UE), seed values for generating a reference signal associated with the first cell and the second cell;
   transmitting, through the first cell to the UE, a notification identifying the first cell or the second cell;
   generating the reference signal associated with the first cell and transmitting through the first cell to the UE the reference signal associated with the first cell and a physical downlink shared channel (PDSCH) when the notification identified the first cell; and
   generating the reference signal associated with the second cell and transmitting through the second cell to the UE the reference signal associated with the second cell and a PDSCH when the notification identified the second cell,
   wherein the transmitted PDSCH is demodulated using the reference signal associated with the first cell or the reference signal associated with the second cell based on the notification.

2. The method of claim 1, wherein the seed values comprise a first seed value corresponding to an Identifier (IP) for the first cell and a second seed value corresponding to an ID for the second cell.

3. The method of claim 1, wherein the seed values comprise a scrambling identity for the reference signal.

4. The method of claim 1, wherein the notification identifying the first cell or the second cell comprises indicating which value among the seed values is used for generating the reference signal sequence in each subframe.

5. The method of claim 4, wherein the notification comprises transmitting information indicating the value used for generating the reference signal sequence, wherein the information is a value of 0 or 1.

6. An eNodeB transmitting a reference signal and including first cell and second cell performing Coordinated Multi Point (CoMP), the eNodeB comprising: a transmitter that transmits a downlink signal; and a processor that:
   controls the transmitter to transmit seed values for generating a reference signal associated with the first cell and the second cell,
   controls the transmitter to transmit a notification identifying the first cell or the second cell,
   generates the reference signal associated with the first cell and transmits the reference signal associated with the first cell and a physical downlink shared channel (PDSCH) when the notification identified the first cell,
   generates the reference signal associated with the second cell and transmits reference signal associated with the second cell and a PDSCH when the notification identify the second cell,
   wherein the transmitted PDSCH is demodulated using the reference signal associated with the first cell or the reference signal associated with the second cell based on the notification.

7. The method of claim 1, wherein the notification is transmitted via a Physical layer channel.

8. A method of receiving a reference signal by a user equipment, the method comprising:
   receiving, from an eNodeB, seed values for generating a reference signal associated with a first cell and a second cell;
   receiving, from the eNodeB, a notification identifying the first cell or the second cell;
   receiving, from the eNodeB, the reference signal associated with the first cell and a physical downlink shared channel (PDSCH) when the notification identified the first cell;
   receiving, from the eNodeB, the reference signal associated with the second cell and a PDSCH when the notification identified the second cell; and demodulating the transmitted PDSCH using the reference signal associated with the first cell or the reference signal associated with the second cell based on the notification.

9. A user equipment receiving a reference signal, the user equipment comprising:
a receiver that receives an uplink signal; and
a processor that controls the receiver to:
receive from an eNodeB seed values for generating a reference signal associated with a first cell and a second cell,
receive from the eNodeB a notification identifying the first cell or the second cell,
receive from the eNodeB the reference signal associated with the first cell and a physical downlink shared channel (PDSCH) when the notification Identified the first cell, and
receive from the eNodeB the reference signal associated with the second cell and a PDSCH when the notification identified the second cell,
wherein the controller further demodulates the transmitted PDSCH using the reference signal associated with the first cell or the reference signal associated with the second cell based on the notification.

* * * * *